United States Patent [19]

Muscatell

[11] 4,441,673
[45] Apr. 10, 1984

[54] AIRFOIL FUEL EJECTION DEVICE

[76] Inventor: Ralph P. Muscatell, 2007 NE. 20th Ave., Fort Lauderdale, Fla. 33305

[21] Appl. No.: 294,377

[22] Filed: Aug. 19, 1981

[51] Int. Cl.³ .......................................... B64D 37/26
[52] U.S. Cl. .............................. 244/135 R; 244/136; 239/171; 251/203
[58] Field of Search ..................... 244/135 R, 136; 239/171; 251/144, 326, 203; 137/601

[56] References Cited

U.S. PATENT DOCUMENTS

| | | | |
|---|---|---|---|
| 1,584,945 | 5/1926 | Johnson | 244/136 |
| 1,673,087 | 6/1928 | Morse | 244/136 |
| 1,793,777 | 2/1931 | Condon | 244/135 R |
| 2,207,724 | 7/1940 | Diehl | 244/135 |
| 2,569,172 | 9/1951 | Jensen | 244/135 |
| 2,573,207 | 10/1951 | Lipman | 244/135 |
| 2,942,839 | 6/1960 | Smith | 251/144 |
| 3,089,677 | 5/1963 | Savaria | 251/58 |
| 3,096,054 | 7/1963 | Ciminaghi | 244/145 |
| 3,272,475 | 9/1966 | Bryant | 251/203 |
| 3,754,601 | 8/1973 | Linkewich | 169/1 A |
| 4,076,035 | 2/1978 | Frisch | 137/601 |
| 4,253,626 | 4/1981 | Muscatell | 244/135 |

FOREIGN PATENT DOCUMENTS

| | | | |
|---|---|---|---|
| 739931 | 8/1943 | Fed. Rep. of Germany | 244/135 R |
| 784049 | 7/1935 | France | 244/135 R |

*Primary Examiner*—Galen L. Barefoot
*Attorney, Agent, or Firm*—Oltman and Flynn

[57] ABSTRACT

The present Airfoil Fuel Ejection Device consists of a retractable bulkhead(s) located in the under-side of the airfoil. The retractable bulkhead(s) is actuated through a combination of rotable worm gear drive shaft, rigid rod guidance members, drive motor, gaskets and remote control mechanism acting in unison. Specific embodiments of the Airfoil Fuel Ejection Device act through levers, support members, tracks, cylinders and pistons, brackets, interior bulkheads and guides. All the embodiments embrace a retractable bulkhead(s) seated in gaskets contoured to the circumference of the bulkhead in order to allow the latter to assume a flush position with the remainder of the under-side of the airfoil during normal flight operations. In addition the gaskets in conjunction with rigid rods assure a secure closure which deters inadvertent leakage or dumping while maintaining the structural integrity of the airfoil. In order to control ejection of fuel or other contents of the airfoil, the pilot can control the rate of ejection through the amount and rate of retraction imparted to the retractable bulkhead(s). The bulkhead(s) retracts inwardly or outwardly depending on the embodiment of the Airfoil Fuel Ejection Device some featuring pivoting while others featuring sliding action in exposing part or all of the fuel storage compartment to the atmosphere. The Airfoil Fuel Ejection Device offers a unique concept in controlled dissipation of the contents of an airfoil while maintaining structural integrity and reliability of the fuel storage compartment and airfoil.

2 Claims, 12 Drawing Figures

AIRFOIL FUEL EJECTION DEVICE

RELATED APPLICATION

This application is an improvement over my U.S. Pat. No. 4,253,626 issued Mar. 3, 1981 and my co-pending U.S. patent application Ser. No. 06/087,161 filed Dec. 10, 1979, now abandoned.

BACKGROUND OF THE INVENTION

As speeds of aircraft continue to increase the requirement of quick decisions and associated executions are mandated in order to maintain safety and preserve lives and property in the crowded skies. The ability to jettison fuel is needed during dire emergency situations such as loss of power during landing and take-off operations to an extent where power to weight ratio is insufficient to maintain flight. Another emergency situation requiring fuel dumping would occur if there were during military action an incendiary weapon in a fuel tank or if there were a wing fire that could not be extinguished. Another is an imminent crash where dumping fuel could prevent fire after crashing. Through the years many devices have been proposed to meet these needs.

For example, U.S. Pat. No. 2,207,724 to Diehl shows a dump valve located in an aircraft fuel compartment coupled with a scoop which directs air into the fuselage, wings and tail assemblies in order to increase pressure in these structures prior to initiating the discharging of fuel. The building up of fuselage, wing and tail pressure prior to and during discharge is required to prevent fuel from entering these confines which are at a reduced pressure to the surrounding environment.

U.S. Pat. No. 2,573,207 to Lipman shows a discharge valve located in an aircraft fuel tank and associated discharge mechanism. The discharge valve and/or discharge mechanism includes all functional and operating parts utilized in the jettison operation in one enclosed device.

U.S. Pat. No. 2,569,172 to Jensen shows a discharge hopper specifically invented to diffuse insecticides or other character of dust from an aircraft. The discharge hopper is lowered from the center section of the aircraft's fuselage and contains agitation mechanism to maintain the proper dispersion of these substances.

U.S. Pat. No. 3,089,677 to Savaria shows a dump valve utilized in an aircraft to discharge chemicals as those used in forest fire assignments. The actuating mechanism is entirely encased and protected from the chemicals to be jettisoned. Included in this invention is a hollow, cylindrical valve, having its interior divided into segments by fin-like radial spokes which tend to dispel turbulence in substances jettisoned.

U.S. Pat. No. 3,096,054 to Ciminagbi shows an interconnected series of separate wing tanks which are normally completely filled and are positioned to receive fuel by gravity from the wing tanks. Fuel is pumped from the intermediate tank to the various engines in such a manner as to avoid any direct communication between the engines and the wing tanks. The intermediate tank is provided with a quick acting discharge valve for dumping the fuel therefrom and from the wing tanks.

U.S. Pat. No. 3,754,601 to Linkewich shows a system for providing loads of retardant slurry on board an aircraft for repeated bombings of a forest fire. The slurry is carried in two drop tanks which have dump doors for direct ejection of the mixture.

U.S. Pat. No. 4,253,626 to Muscatell shows a trap door on the under-side of an airfoil. The door is both part of the under-side of the airfoil and fuel compartment. The trap door is hinged on the forward edge and fastened with a latch on the rear edge of the airfoil. A gasket around the circumference of the trap door mates with the contact surface of the airfoil forming a seal. This trap door swings outward and downward under jettisoning conditions to release stored fuel.

Republic of France Pat. No. 636,411 to Sociéte d' Emboutissage et de Constructions Méchaniques shows hand actuated valves for use in an aircraft to jettison the contents of fuel and ballast tanks.

SUMMARY OF THE INVENTION

The present invention is directed to a novel and improved Airfoil Fuel Ejection Device and several specific embodiments of the device. The Airfoil Fuel Ejection Device is integrated into the under-side of an airfoil in order to facilitate the immediate or controlled release of fuel or other fluid contents present in the air-foil. The pilot or other control authority exercising a remote control mechanism can expose the cavity housing the fuel storage compartment to the surrounding atmosphere at a controlled rate to the desired degree of exposure. A retractable bulkhead forms the bottom closure of the fuel compartment on the under-side of the airfoil. The retractable bulkhead forms an integral component of the under-side of the airfoil and isolates the fuel storage compartment from the atmosphere.

The remote mechanism actuates a control means for displacing at the selected rate the retractable bulkhead from its at rest normal flight operation posture to the desired degree of partial or full retraction. Acting through control means, such as rigid rods, levers, cylinders, pistons, etc., the pilot maintains the capability at his immediate command to offset the retractable bulkhead from the remainder of the under-side of the airfoil to control his fuel load. The result of offsetting the retractable bulkhead is the exposing of the fuel storage container to the atmosphere and the regulated ejection of the contents of this container.

The remote control mechanism operates through a drive-motor in order to actuate the control means which displaces the retractable bulkhead and directs the controlled jettisoning of the contents of the fuel storage compartment. The retractable bulkhead is under the operational control of a rotatable worm gear drive shaft and rigid rods which impart stability to the Airfoil Fuel Ejection Device through the various configurations which it can assume from its at rest position to full exposure of the fuel storage compartment. While at rest the retractable bulkhead is seated in secure position with respect to the remainder of the under-side of the airfoil. A gasket means is affixed to each and every side of a seat formed in the airfoil to receive the retractable bulkhead in order to provide structural integrity and achieve maximum closure. Inadvertent leakage or dumping is inhibited and eliminated by the functioning combination of retractable bulkhead, rotable worm gear drive shaft, rigid rods and gasket seat forming an impenetrable closure.

A principal object of this invention is to furnish a novel and improved means of controlling fuel ejection from an airfoil while insuring the integrity of the airfoil and the fuel storage compartment.

Another object of this invention is to give to the pilot or command authority of an aircraft the capability to immediately eject the contents of the fuel storage compartment of an airfoil.

Another object of this invention is to provide the pilot or command authority of an aircraft the ability to control the rate and amount of jettisoning of fuel from the fuel storage compartment in the airfoil.

Another object of this invention is to provide a retractable bulkhead on the under-side of an airfoil which maintains the structural integrity of the airfoil.

Another object of this invention is to assure that a retractable bulkhead is responsive through remote mechanism to the operational commands of the aircraft's control authority.

Another object of this invention is to provide a drive-motor operating in response to a remote control mechanism to actuate control mechanisms which positions the retractable bulkhead in order to allow controlled release of the contents of the fuel storage compartment.

Another object of this invention is the novel and improved manner of utilizing a rotable worm gear drive shaft to position the retractable bulkhead by providing both structural integrity and controlled displacement.

Another object of this invention is to design an improved manner of employing rigid rods and levers to control and guide a retractable bulkhead through a prescribed series of pre-determined positions in the under-side of an airfoil.

Another object of this invention is to design a combination of interacting rotable worm gear drive shaft, rigid rods, levers and mounts which function in an immediate mode to displace a retractable bulkhead at the selected rate to the desired location in the under-side of an airfoil.

Another object of this invention is the novel and improved manner of utilizing gaskets to form the seat for a retractable bulkhead in the under-side of an airfoil to insure structural integrity and prevent leakage and inadvertent dumping from a fuel storage compartment of an airfoil.

Another object of this invention is the novel and improved manner of combining gaskets with a retractable bulkhead in an aerodynamic structure in order to guarantee the appropriate sealing engagement required to maintain contents of an airfoil under diverse climatic and operational conditions.

Another object of this invention is the plurality of arrangements for positioning a retractable bulkhead through prescribed locations from the retractable bulkhead's normal flight operation position to full exposure of the fuel storage compartment.

Another object of this invention is the novel and improved manner of positioning the retractable bulkhead to a position which exposes the fuel storage compartment to the atmosphere and its return under hazardous or unscheduled conditions, like those mentioned hereinbefore.

Another object of this invention is the novel and improved combination of a rotable worm gear drive shaft and rigid rods maintaining the retractable bulkhead in a sealed and secure at rest normal flight operation position.

Another object of this invention is the novel and improved combination of a rotable worm gear drive shaft and rigid rod displacing the retractable bulkhead and exposing the fuel storage compartment of an airfoil.

Further objects and advantages of the present invention will be apparent from detailed description of certain presently-preferred embodiments thereof, shown in the accompanying drawings in which.

Before explaining the disclosed embodiments of the present invention in detail, it is to be understood that the invention is not limited in its application to the details of the particular arrangement shown since the invention is capable of other embodiments. Also, the terminology used herein is for the purpose of description and not of limitation.

Figure 1A:
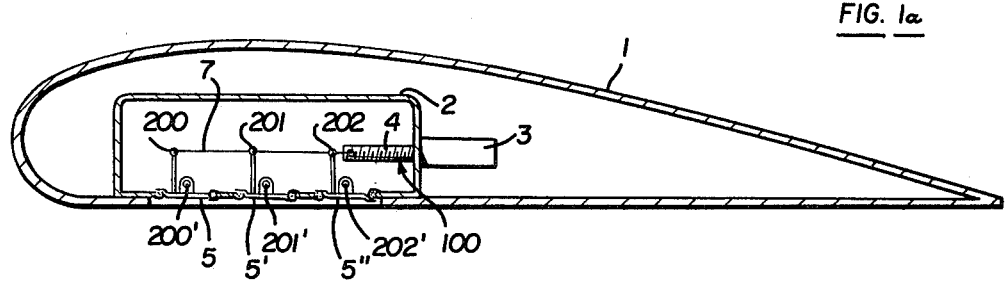
FIG. 1a is a schematic longitudinal cross-section view illustrating an airfoil with the retractable bulkhead sectioned into multiple doors actuated by rigid rods and levers by means of a rotable worm gear drive shaft.
Figure 1B:
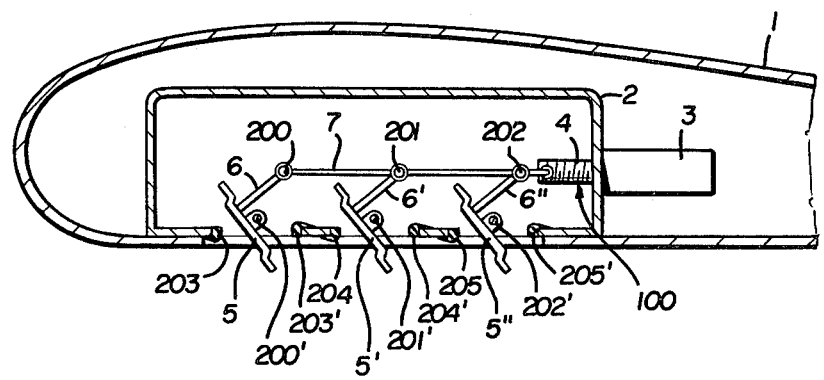
FIG. 1b is a view similar to FIG. 1a, but illustrating the retractable doors displaced internally from its at rest position in the under-side of an airfoil exposing the fuel storage compartment.

Referring first to FIG. 1b, the Airfoil Fuel Ejection Device 100 is installed in airfoil 1. This cross-section longitudinal view details the rotable worm gear drive shaft 4 coupled to drive-motor 3 and the rigid rods 6, 6' and 6" through lever arm 7 and pivotal intersections 200, 200', 201, 201' and 202, 202'. The retractable bulkhead is sectioned into multiple square portals 5, 5' and 5" which seat on their four sides into gaskets 203, 203', 204, 204', 205 and 205', FIG. 1b, in order to insure structural integrity and maintain maximum closure of the fuel storage compartment 2. The pilot or other command authority through the remote control mechanism initiates drive-motor 3 which positions the rotable worm gear drive shaft 4 and actuates lever arm 7 and rigid rods 6, 6', 6" in order to displace portals 5, 5' and 5" outward at the selected rate to the desired location FIG. 1b. Operating the remote control mechanism in the reverse direction reseats portals 5, 5' and 5" against the under-side of airfoil 1 and inhibits additional loss from fuel storage compartment 2.

Figure 2A:
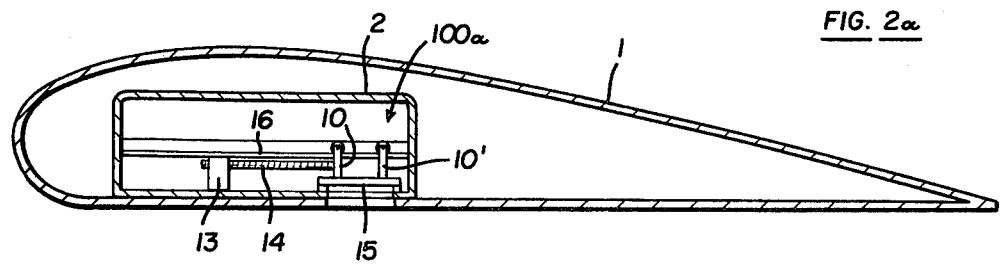
FIG. 2a is a schematic longitudinal cross-section view illustrating a second embodiment having an airfoil with the retractable bulkhead designed as a unitary door member actuated by cylinders and pistons by means of a rotable worm gear drive shaft.
Figure 2B:
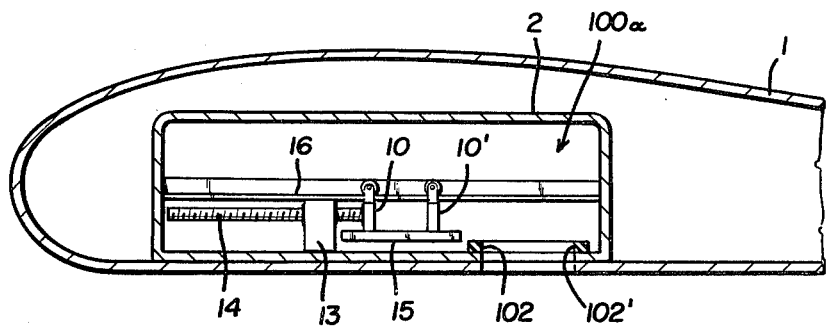
FIG. 2b is a view similar to FIG. 1b, but illustrating the unitary door member slid forward from its at rest position in the under-side of an airfoil exposing the fuel storage compartment.

FIG. 2a is an alternate embodiment of the Airfoil Fuel Ejection Devicr 100a as installed in airfoil 1. The cross-section longitudinal view details the rotable worm gear drive shaft 14 coupled to drive motor 13 and the pistons and cylinders 10 and 10' along the guide track 16. The retractable bulkhead is designed as a unitary door member 15 which seats on its four sides into gasket 102 and 102', FIG. 2b, in order to insure structural integrity and maintain maximum closure of the fuel storage compartment 2. The pilot or other command authority through the remote control mechanism initiates drive motor 13 which positions rotable worm gear drive shaft 14 and actuates pistons and cylinders 10 and 10' in order to displace unitary door number 15 vertical and forward in an inward direction along guide track 16 at the selected rate to the desired location, FIG. 2b. Operating the remote control mechanism in the reverse direction reseats unitary door member 15 against the underside of airfoil and inhibits additional loss from fuel storage compartment 2. Piston and cylinder devices 10 and 10' displace downward to seal door 15 after it is aligned with gasket 102 and 102'. There is adequate play in the worm gear drive to accommodate this vertical movement which is very small.

Figure 3A:
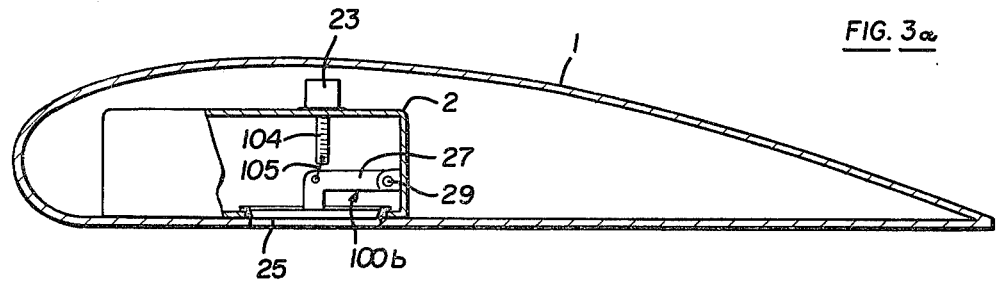
FIG. 3a is a schematic longitudinal cross-section view illustrating a third embodiment having an airfoil with a retractable bulkhead which is a unitary door member pivotally mounted to an L-bracket and actuated by rigid rods by means of a rotable worm gear drive shaft.
Figure 3B:
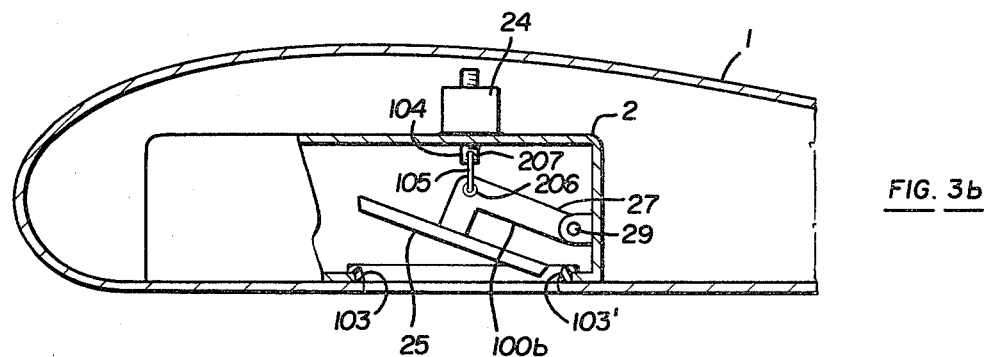
FIG. 3b is a view similar to FIG. 3a, but illustrating the unitary door member pivotally displaced from its at rest position in the under-side of an airfoil exposing the fuel storage compartment.

FIG. 3a is an alternate embodiment of the Airfoil Fuel Ejection Device 100b as installed in airfoil 1. The cross-section longitudinal view details the rotable worm gear drive shaft 104 coupled to drive motor 23 and rigid rod 105. Rod 105 has pivot 207 and another pivot 206 on L-bracket 27 which is attached to fuel storage compartment 2 at pivotal intersection 29. In addition rod 105 is pivoted at 207. The retractable bulkhead is designed as a unitary door member 25 which seats on its four sides into gaskets 103 and 103', FIG. 3b, in order to insure structural integrity and maintain maximum closure of the fuel storage compartment 2. The pilot or other command authority through the remote control mechanism initiates drive motor 23 which positions the rotable worm gear drive shaft 104 and actuates pivoted rigid rod 105 in order to tilt L-bracket 27 upward and inward displacing unitary door member 25 at the selected rate to the desired location FIG. 3b. Operating the remote control mechanism in the reverse direction reseats unitary door member 25 against the underside of airfoil 1 and inhibits additional loss from fuel storage compartment 2.

Figure 4A:
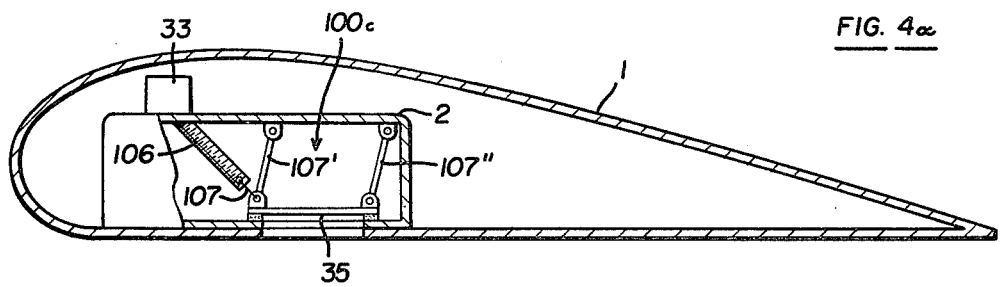
FIG. 4a is a schematic longitudinal cross-section view illustrating a fourth embodiment having an airfoil with a retractable bulkhead which is a unitary door member and is supported pivotally from support members through rigid rods which are actuated by means of a rotable worm gear drive shaft.
Figure 4B:
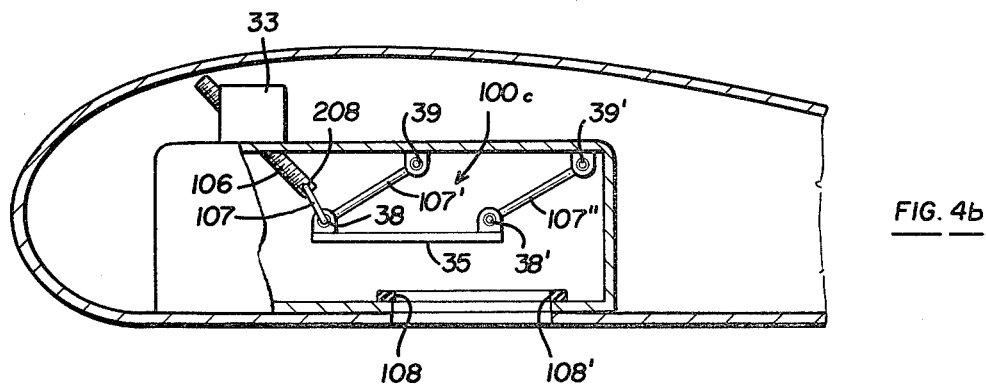
FIG. 4b is a view similar to FIG. 4a, but illustrating the unitary door member pivotally displaced from its at rest position in the under-side of an airfoil exposing the fuel storage compartment.

FIG. 4a is an alternate embodiment of the Airfoil Fuel Ejection Device 100c as installed in airfoil 1. The cross-section longitudinal view details the rotable worm gear drive shaft 106 coupled to drive motor 33 and to rigid rods 107, 107' and 107" through overhead pivotal brackets 39 and 39' and pivotal brackets 38 and 38" on unitary door member 35 which seats on its four sides into gaskets 108 and 108'. FIG. 4b, in order to insure structural integrity and maintain maximum closure of the fuel storage compartment 2. In addition rod 107 is pivoted at 38 and 208. The pilot or other command authority through the remote control mechanism initiates drive motor 33 which positions the rotable worm gear shaft 106 upward, forward and inward of the interior of airfoil 1 and actuates rigid rods 107, 107' and 107" to tilt unitary door member 35 in the same direction at selected rate to the desired location, FIG. 4b. Operating the remote control mechanism in the reverse direction reseats unitary door member 35 against the underside of airfoil 1 and inhibits additional loss from fuel storage compartment 2.

Figure 5A:
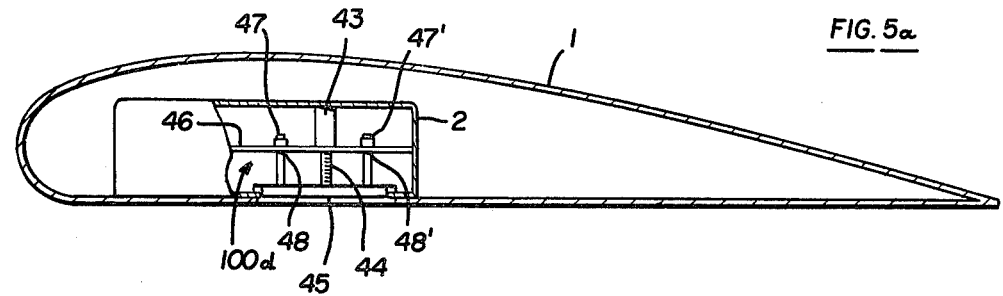
FIG. 5a is a schematic longitudinal cross-section view illustrating a fifth embodiment having an airfoil with a retractable bulkhead which is a unitary door member which is supported and actuated by means of a vertically mounted rotable worm gear drive shaft.
Figure 5B:
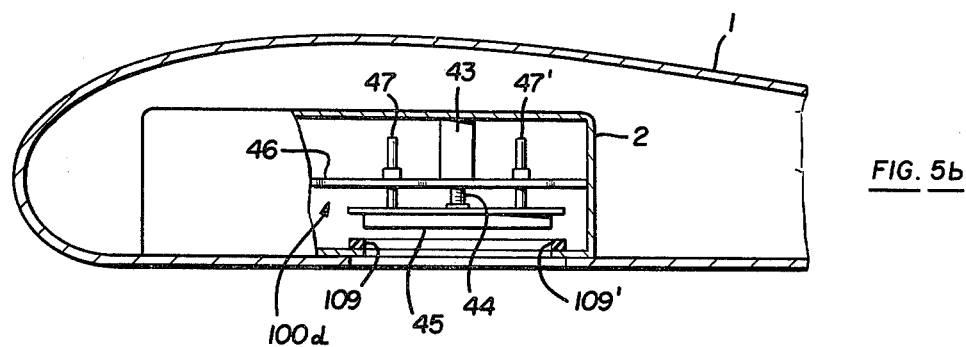
FIG. 5b is a view similar to FIG. 5a, but illustrating the unitary door member vertically displaced from its at rest position in the under-side of an airfoil exposing the fuel storage compartment.

FIG. 5a is an alternate embodiment of the Airfoil Fuel Ejection Device 100d as installed in airfoil 1. The cross-section longitudinal view details the vertically installed rotable worm gear drive shaft 44 coupled to drive motor 43 and unitary door member 45 which is guided vertically by guides 47 and 47' which penetrate support member 46 at 48 and 48'. The retractable bulkhead is designed as a unitary door member 45 which seats on its four sides into gaskets 109 and 109', FIG. 5b, in order to insure structural integrity and maintain maximum closure of the fuel storage compartment 2. The pilot or other command authority through the remote control mechanism initiates drive motor 43 which positions the vertically mounted rotable worm gear drive shaft 44 upward, displacing unitary door member 45 inward at the selected rate to the desired location FIG. 5b. Operating the remote control mechanism in the reverse direction reseats unitary door member 45 against the under-side of airfoil 1 and inhibits additional loss from fuel storage compartment 2.

Figure 6A:
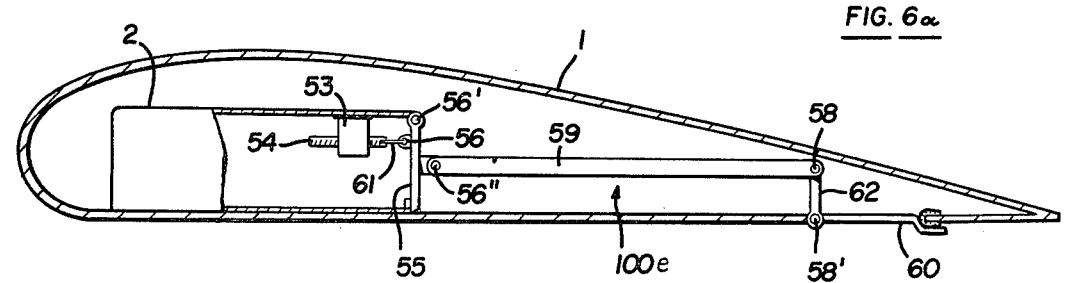
FIG. 6a is a schematic longitudinal cross-section view illustrating a sixth embodiment having an airfoil with a retractable bulkhead secured and actuated by an interior vertical bulkhead coupled by rigid rods acting through a rotable worm gear drive shaft.
Figure 6B:
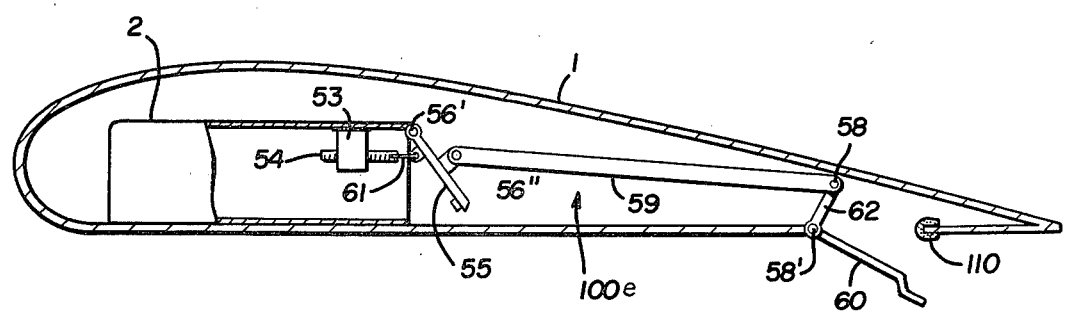
FIG. 6b is a view similar to FIG. 6a, but illustrating the unitary door member pivotally displaced externally from its at rest position in the under-side of an airfoil exposing the full storage compartment.

FIG. 6a is an alternate embodiment of the Airfoil Fuel Ejection Device 100e as installed in airfoil 1. The cross-section longitudinal view details the horizontally installed rotable worm gear drive shaft 54 coupled to drive motor 53 and to vertical bulkhead 55 through rigid rod 61 at pivotal bracket 56, FIG. 6b. Vertical bulkhead 55 is connected to unitary door member 60 by rigid rods 59 and 62 through pivotal connections 56, 56', 58 and 58'. The retractable door bulkhead is designed as a unitary door member 60 which seats on its four sides into gasket 110 in order to insure structural integrity and maintain maximum closure of the fuel storage compartment 2. The pilot or other command authority through the remote control mechanism initiates drive motor 53 which positions rotable worm gear drive 54 and rigid rod 61 horizontally to the rear. Vertical bulkhead 55 is positioned upward and to the rear of the interior of the airfoil, causing rigid rods 59 and 62 and to act on unitary door member 60 and cause it to open in an outward and downward direction at the selected rate to the desired location. Operating the remote control mechanism in the reverse direction reseats unitary door member 60 against the under-side of airfoil 1 and inhibits additional loss from fuel storage compartment 2.

I claim:

1. An airfoil fuel ejection device integrated into an under-side of an airfoil in order to facilitate the immediate release of fuel or other fluid contents present in a fuel storage compartment means in said airfoil through a remote control mechanism, said device comprising in combination:

a retractable bulkhead means for forming a bottom closure of said fuel storage compartment means maintaining a normal flight operation position in which it forms an integral component of said under-side of said airfoil and isolates said fuel storage compartment means from the atmosphere, said retractable bulkhead means in said normal flight operation position thereof extending across most of the extent of said fuel storage compartment means laterally of the air-foil;

a worm gear control means for maintaining said retractable bulkhead means in said under-side of said airfoil and for displacing said retractable bulkhead means from said normal flight operation position thereof to an open position in which it is offset from the remainder of the under-side of the airfoil and opens said fuel storage compartment means to the atmosphere for rapid and controlled dumping of the fuel;

a drive-motor means operatively coupled to said retractable bulkhead means through said worm gear control means for displacing said retractable bulkhead means from said normal flight operation position through prescribed displaced positions to a fully retracted position in response to the operation of said worm gear control means and drive motor means as dictated by said remote control mechanism;

a rigid rod guidance means for the controlled displacement of said retractable bulkhead means through various prescribed positions in order to guide said retractable bulkhead means in orderly fashion from said normal flight operation position to the fully retracted position and return; and a gasket closure means for securing and sealing said retractable bulkhead means in order to provide restraint on said retractable bulkhead means and maintain the latter in sealed engagement with said airfoil during said normal flight operation position and prevent inadvertent leakage or dumping;

said retractable bulkhead means comprising a unitary door member slidably mounted reciprocably from forward to rear on said under-side of said airfoil through prescribed locations between said normal flight operation position and where said fuel compartment is fully exposed;

said rigid rod guidance means comprising a track means extending substantially parallel to said under-side of said airfoil from forward to rear above said unitary door member;

said rigid rod guidance means further comprising cylinders and pistons operatively coupled to said track means for directing and controlling said unitary door member through multiple locations between said normal flight operation position and where said fuel compartment means is fully exposed;

said worm gear means comprising a rotatable worm gear driving shaft operated by said drive motor means under the control of said remote control mechanism, said worm gear driving shaft being operatively coupled to said cylinders and pistons to guide said unitary door member internally through multiple locations between said normal flight operation position and where said fuel compartment is fully exposed; and said gasket closure means comprising gasket means affixed on said under-side of said airfoil for sealed engagement by said unitary door member in said normal flight operation position in order to provide structural integrity and achieve maximum closure for said fuel storage compartment means.

2. An airfoil fuel ejection device integrated into an under-side of an airfoil in order to facilitate the immediate release of fuel or other fluid contents present in a fuel storage compartment means in said airfoil through a remote control mechanism, said device comprising in combination:

a retractable bulkhead means for forming a bottom closure of said airfoil maintaining a normal flight operation position in which it forms an integral component of said under-side of said airfoil and isolates said fuel storage compartment means from the atomosphere, said retractable bulkhead means in said normal flight operation position thereof extending across the airfoil for most of the extent of said fuel storage compartment means laterally of the airfoil;

a worm gear control means for maintaining said retractable bulkhead means in said under-side of said airfoil and for displacing said retractable bulkhead means from said normal flight operation position thereof to an open position in which it is offset from the remainder of the under-side of the airfoil and opens the interior of the airfoil to the atmosphere;

a drive-motor means operatively coupled to said retractable bulkhead means through said worm gear control means for displacing said retractable bulkhead means from said normal flight operation position through prescribed displaced positions to a fully retracted position in response to the operation of said worm gear control means and drive motor means as dictated by said remote control mechanism; and a gasket closure means for securing and sealing said retractable bulkhead means in order to provide restraint on said retractable bulkhead means and maintain the latter in sealed engagement with said airfoil in said normal flight operation position and prevent inadvertent leakage or dumping of fuel;

said retractable bulkhead means comprising a unitary door member pivotally mounted to the rear of said under-side of said airfoil in order to move through a prescribed arc outward from said under-side of said airfoil between said normal flight operation position and where the interior of the airfoil is exposed;

said worm gear control means comprising a horizontally mounted rotatable worm gear drive shaft in said fuel storage compartment means in said airfoil and coupled directly to and operated by said drive motor means through said remote control mechanism, said horizontally mounted rotatable worm gear drive shaft being coupled by a pivotal rigid rod to an interior vertical bulkhead in order to displace said interior vertical bulkhead from its vertical disposition through an upward arc to open said fuel storage compartment means;

said interior vertical bulkhead being pivotally coupled to said unitary door member to position the latter through a prescribed arc between said normal flight operation position and where the interior of the airfoil is open when said vertical bulkhead is displaced through an upward arc to open said fuel storage compartment means; and said gasket closure means comprising gasket means affixed to the under-side of said aircraft for sealing engagement by said unitary door member in said normal flight operation position.

* * * * *